A. B. PAIGE.
Improvement in Process and Apparatus for Cleaning, Decorticating, and Scouring Rice, Wheat, and other Grain.

No. 124,848. Patented March 19, 1872.

Witnesses.
Wm Howard
A. G. Hall

Inventor.
A. B. Paige
By Daniel Breed
Atty.

A. B. PAIGE.
Improvement in Process and Apparatus for Cleaning, Decorticating, and Scouring Rice, Wheat, and other Grain.

No. 124,848. Patented March 19, 1872.

Witnesses.
Wm Howard.
N. G. Hall

Inventor.
A. B. Paige
By Daniel Breed
Atty.

124,848

UNITED STATES PATENT OFFICE.

AUSTIN B. PAIGE, OF WASHINGTON, DISTRICT OF COLUMBIA.

IMPROVEMENT IN PROCESSES AND APPARATUS FOR CLEANING, DECORTICATING, AND SCOURING RICE, WHEAT, AND OTHER GRAIN.

Specification forming part of Letters Patent No. 124,848, dated March 19, 1872.

SPECIFICATION.

I, AUSTIN B. PAIGE, of Washington, District of Columbia, have invented certain Improvements in the Method of Cleaning and Decorticating Grain, of which the following is a specification:

The nature of my invention lies in providing means to clean, polish, and separate rice and other cereals, and, in the case of wheat and similar grains, to scour off the cuticle and separate the dust and bran from the kernels without cracking or otherwise injuring the grain.

Heretofore grain has been scoured by direct mechanical agencies in the form of revolving cylinders, beaters, rubbers, stampers, &c.; but by the employment of which means great disadvantages arise, such as increased friction of the moving parts, and the liability of injuring the grain or material acted on by its direct contact with such moving parts.

The chief object, accordingly, of my invention is to clean and scour grain by moving the same upon a stationary scouring surface or surfaces, and I employ an artificial air-blast to alone move or agitate the grain upon or against said scouring surface or surfaces. Thus I propose a radical change in the art of scouring grain by introducing the pneumatic process as a substitute for the mechanical process or processes heretofore used or known. My invention, therefore, consists, first, in the employment of an artificial air-blast to move the grain upon or against the scouring surface or surfaces before mentioned by means of a fan or blower and other devices; second, in a peculiarly novel arrangement of devices for distributing intermittingly the air-blast, and dividing it so as to act evenly upon all portions of the grain; third, in a special construction of corrugations or uneven surfaces for the scouring-chambers, thus increasing the extent of said surfaces and rendering the same more efficient; and also in other improvements, which will be hereafter explained.

Figure 2:
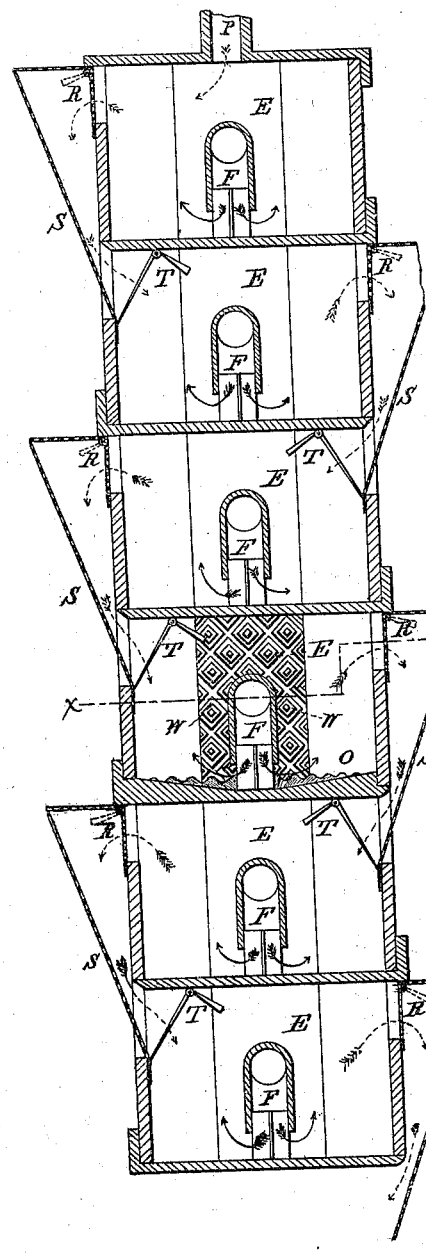
Figure 1:
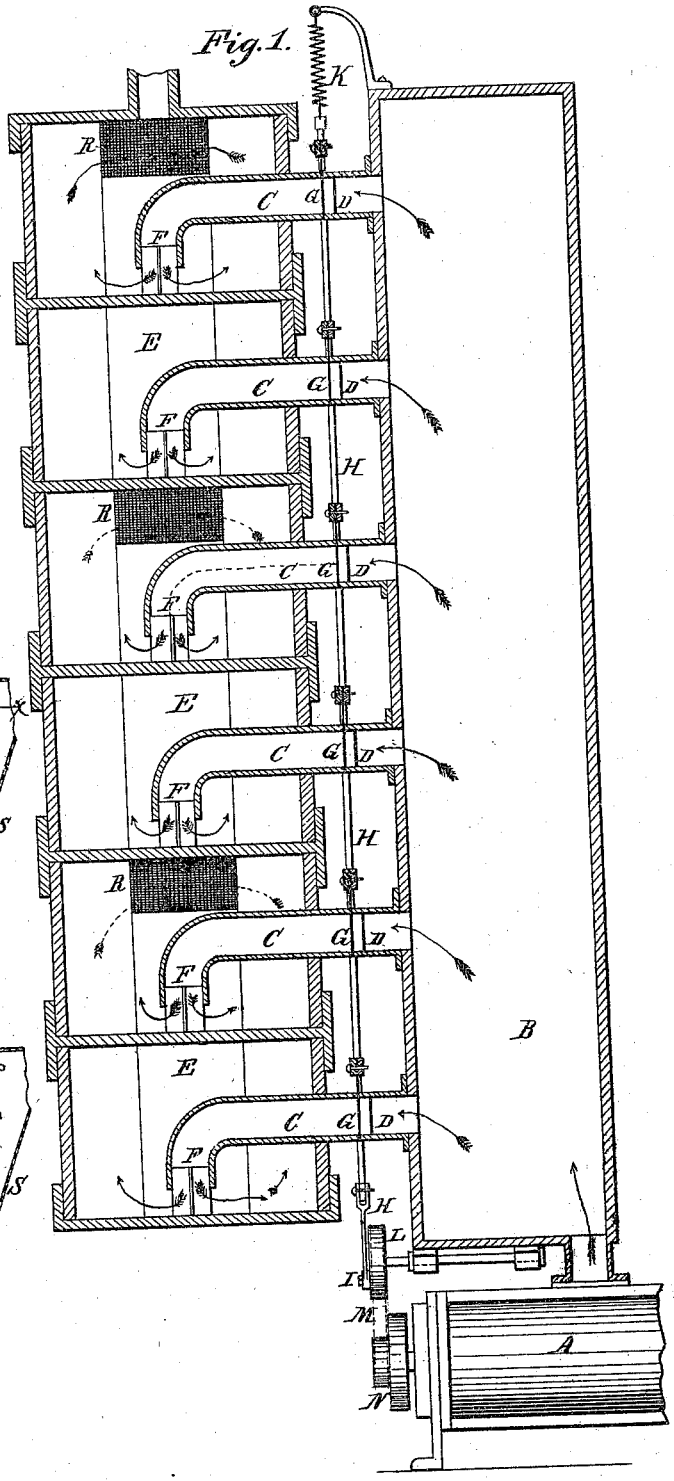
Figure 3:
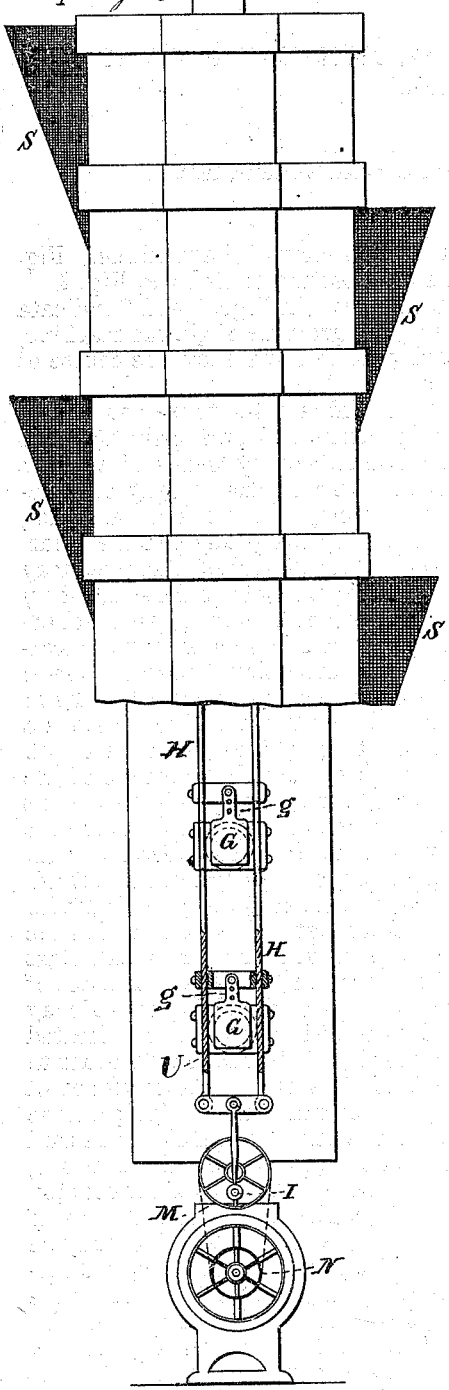
Figure 4:
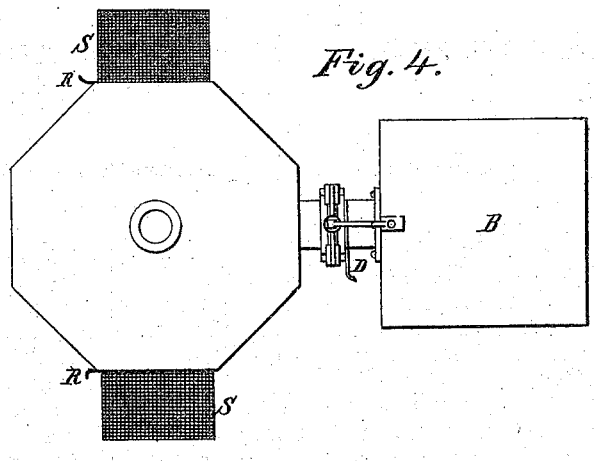
Figure 5:
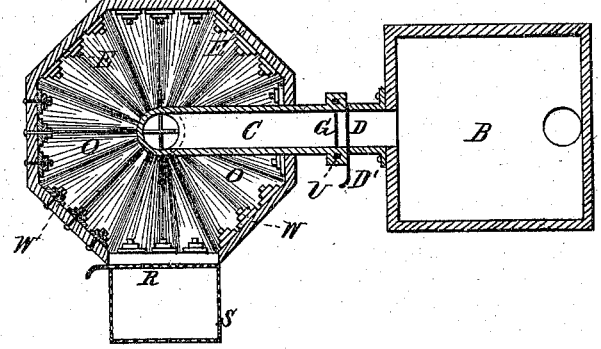

In the accompanying drawing, Figure 3 is a front view of my machine. Fig. 1 is a vertical section of the same. Fig. 2 is also a vertical section transverse to the section shown in Fig. 1. Fig. 4 is a top view of the machine. Fig. 5 is a horizontal section on line $x\ x$, Fig. 2.

The dotted arrows in Figs. 1 and 2 indicate the course of the grain through the machine, and the arrows in full line show the course of the air-blast.

My machine differs from those now in use by employing stationary scouring-surfaces and moving the grain itself by means of a fan or artificial blast of air, as has already been described. In the employment of an air-blast, however, for moving the grain upon the scouring-surfaces, different forms of machines may be used without departing from the spirit of my invention. At present I prefer to use mechanism for providing compressed air, and in carrying out my preferred plan the fan or blower A, Fig. 1, is employed to compress the air in chamber or reservoir B, from which there is a series of air-passages or tubes, C, provided with slides D, which are movable by means of the handle D', Fig. 5, in order to regulate the amount of air passing through them. Each air-tube C terminates in a scouring-chamber, E, which is to contain more or less grain, as desired. The nozzles of the tubes C are provided with a division or cross-plate, F, which divides the blast into four parts and thus directs the blast evenly upon the grain and the four sides of the chamber E. These division-plates F may be extended to the wind-gate G, as indicated in dotted lines, Fig. 1, if desired, in order to cut off the blast in some of the branches of the tube C and yet maintain the full pressure of the blast in the other branches of the said tube. The blast-tube may have eight divisions, corresponding to the eight sides of the octagon chamber shown, which may itself also be of different shape, if desired. The blast may be directed upon the top of the grain, or the nozzle of tube C may extend to the bottom of the chamber E so as to lift the grain. In the tubes C is arranged a series of wind-gates, G, connected by rods H, which run in holes or guides U, Figs. 3 and 5. These gates G and rods H are moved up and down by means of the crank-pin I, revolving with the pulley L and acting in connection with the coiled spring K, Fig. 1. This spring, by producing tension upon the rods H, makes said rods and the gates move as if rigidly connected, thus preventing any jar upon the pivots or joints when the motion is reversed. The crank-pin I and pulley L derive motion from band M, which passes over the pulley N on the shaft of the fan. By this arrangement an intermitting blast is produced in the tubes C, for the purpose of moving the grain, by a succession of wind strokes, and also allowing the kernels to fall or rebound between these strokes, and thus facilitate the scouring process. These wind-gates G are also made adjustable upon the rods H by means of holes g, Fig. 3, so as to cut off all or part of the blast by the reciprocating stroke of the gates G. If a continuous blast is desired the belt M may be thrown off and the wind-gates G adjusted to regulate the amount of blast. I have made the chambers E of an octagon shape, as seen in Fig. 5, but they may be of any other suitable form, as before mentioned. They are provided with a corrugated bottom, O, Figs. 2 and 5, and also with a series of terraced or pyramidal scouring-surfaces, W, made of stones bolted to the sides of the chamber, as seen in Figs. 2 and 5, in order to make the moving grain bound and rebound upon the steps of the scouring terraces or pyramids as the blast drives the grain against the sides of the chamber. These terraced stones may be molded, or the whole sides of the chambers may be in like manner molded from mortar suitable for artificial stone. For rice no metallic scouring-surface should be employed, but for wheat the sides of the chamber E may be cast-iron and the terraced stones bolted thereto, as shown in Fig. 5.

Operation.

The operation is as follows: The grain is fed in at P, Fig. 2, through the top of the upper chamber E. The air-blast is then turned on, driving the kernels of grain from the center of said chamber and scouring the same upon the stationary and irregular surfaces thereof, as above mentioned, as well as by attrition among themselves. The dust, &c., passes out through screen-hopper S, leaving the kernels yet in the chamber. After a time the grain accumulates in the upper chamber and begins to pass over through an adjustable discharge-opening in the side of the chamber; or the screens R, fig. 2, can be made adjustable and automatic in their operation, being hinged and weighted for the purpose, as indicated in dotted lines. The dust, bran, hulls, &c., all pass through the screen S, which also directs the grain into the next chamber below, where it accumulates against the weighted valve T, which is also in part kept closed by the pressure of the blast. The weight of the grain and the intermitting of the blast by alternately closing and opening the wind-gates G, operated as above explained, will soon open the valve T, when the grain falls, and the valve is again closed and stops the flow of grain. In the second chamber E the grain undergoes a similar scouring as in the first chamber, and passes out on the opposite side to be separated, and then falls into the third chamber E, and there is again scoured. Thus the grain may pass down through the whole series of chambers, in the last of which it is to be polished.

I prefer to use coarser stones or scouring-surfaces in the upper three chambers, and make the fourth from the top of finer scouring-surface, while the fifth is still finer, and the sixth or last the finest of all. Also the three lower screens should be successively coarser in order to separate, first, the imperfect kernels and blighted ones, then the smaller kernels, and at last deliver the largest and best, thus giving several grades of rice for the market, or separating other grain from foreign matter and imperfect kernels previous to grinding.

The machine as described, or the chambers at least, should be inclosed in a suitable hood, with dust and bran spouts, as is well understood, in order to deliver the grain and refuse separately.

Each alternate wind-gate G may be reversed so as to work from the under side of tube C, and thus open one-half of the wind-gates as the rods H move upward and the other half of said rods move downward.

Claims.

Having now fully described the nature, objects, and peculiar features of my invention, I claim—

1. The combination of the fan or blower A, the air-chamber or reservoir B, the tube C, and scouring-chamber E, as and for the purpose set forth.

2. I claim the series of chambers E and air-tubes C, when arranged, as described, for repeating the process of scouring, and also for polishing the grain, substantially as set forth.

3. I claim the scouring-chamber E, when provided with the terraced pyramidal stones W, constructed substantially as described and set forth.

4. I also claim said chamber E, when provided also with the corrugated bottom or surface O, constructed substantially as described and shown.

5. I claim the cross distributing plate F, in combination with the tube C and wind-gate G, substantially as set forth.

6. In combination with the scouring-chambers E, I claim the screen-hoppers S and the valves T, for separating the dust and bran and conducting the grain from one scouring-chamber to the next one below, substantially as set forth.

7. I claim the combination of the reciprocating wind-gate G with the fan or blower A and the air-chamber or reservoir B, for the purpose of giving an intermitting blast or succession of wind-strokes upon the grain within the scouring-chambers, substantially as set forth.

8. I claim the process of cleaning, scouring, and decorticating grain of all kinds by the employment of stationary scouring chambers or surfaces, and an artificial air-blast made to move and agitate the kernels of said grain in said chamber or against said scouring-surfaces, whereby said kernels are decorticated, scoured, cleaned, and polished by attrition against said surfaces and among themselves, substantially in the manner described and set forth.

AUSTIN B. PAIGE.

Witnesses:
 DANIEL BREED,
 A. G. HALL.